United States Patent [19]
Whitehouse et al.

[11] Patent Number: 6,068,688
[45] Date of Patent: May 30, 2000

[54] PARTICLE HAVING AN ATTACHED STABLE FREE RADICAL AND METHODS OF MAKING THE SAME

[75] Inventors: Robert S. Whitehouse, Lexington, Mass.; Russell L. Warley, Erie, Pa.; Thimma R. Rawalpally, Florence, S.C.; Hairuo Tu, Burlington, Mass.

[73] Assignee: Cabot Corporation, Boston, Mass.

[21] Appl. No.: 08/968,299

[22] Filed: Nov. 12, 1997

[51] Int. Cl.[7] ............................. C09D 11/00; C08K 9/04; C09C 1/62; C09C 1/64; C09C 1/00

[52] U.S. Cl. ................................. 106/31.65; 106/31.75; 106/31.76; 106/31.77; 106/31.78; 106/31.9; 106/403; 106/404; 106/436; 106/447; 106/448; 106/450; 106/453; 106/455; 106/456; 106/460; 106/461; 106/471; 106/472; 106/473; 106/474; 106/475; 106/476; 106/479; 106/480; 106/481; 106/49; 523/200; 523/215

[58] Field of Search ..................... 106/472, 473, 106/476, 474, 475, 461, 471, 436, 438, 439, 440, 441, 442, 403, 404, 432, 433, 434, 435, 445, 446, 447, 448, 449, 450, 451, 453, 454, 455, 456, 457, 459, 460, 479, 480, 481, 490, 491, 31.6, 31.65, 31.75, 31.76, 31.77, 31.78, 31.9; 523/200, 215

[56] References Cited

U.S. PATENT DOCUMENTS

| | | | |
|---|---|---|---|
| T860,001 | 3/1969 | Gessler | 260/41.5 |
| 2,121,535 | 8/1938 | Amon | 106/473 |
| 2,439,442 | 4/1948 | Amon et al. | 23/209.1 |
| 2,793,100 | 5/1957 | Weihe | 423/460 |
| 2,867,540 | 1/1959 | Harris | 106/476 |
| 3,011,902 | 12/1961 | Jordon . | |
| 3,025,259 | 3/1962 | Watson et al. | 106/476 |
| 3,317,458 | 5/1967 | Clas et al. | 260/41.5 |
| 3,335,020 | 8/1967 | Aboytes et al. | 106/476 |
| 3,423,391 | 1/1969 | Kindler et al. | 260/141 |
| 3,528,840 | 9/1970 | Aboytes | 106/473 |
| 3,671,476 | 6/1972 | Terai et al. | 260/23 |
| 3,686,111 | 8/1972 | Makhlouf et al. | 524/530 |
| 4,006,031 | 2/1977 | Ferch et al. | 106/473 |
| 4,014,844 | 3/1977 | Vidal et al. | 106/472 |
| 4,265,768 | 5/1981 | Beasley et al. | 210/682 |

(List continued on next page.)

FOREIGN PATENT DOCUMENTS

| | | |
|---|---|---|
| 0 006 190 A1 | 1/1980 | European Pat. Off. . |
| 0 475 075 A1 | 3/1992 | European Pat. Off. . |
| 0 050 354 | 4/1992 | European Pat. Off. . |
| 72775 | 4/1960 | France . |

(List continued on next page.)

OTHER PUBLICATIONS

Derwent Abstract, AN No. 80–03330C, "Sulphonated Carbon Pigment Production by Treating Technical Grade Carbon with Hot Aqueous Acid," SU,A, 659523, Apr. 1979.

(List continued on next page.)

*Primary Examiner*—David Brunsman

[57] ABSTRACT

A modified particle is disclosed wherein a particle has an attached group having the formula:

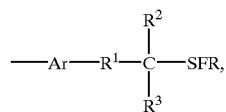

(I)

wherein Ar represents an aromatic group; $R^1$ represents a bond, an arylene group, an alkylene

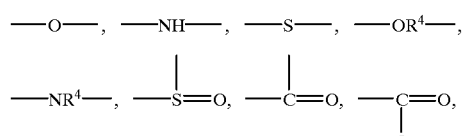

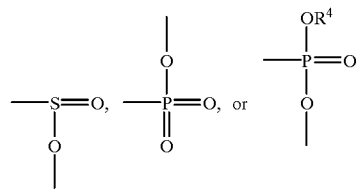

wherein $R^4$ is an alkyl or alkylene group or an aryl or arylene group; $R^2$ and $R^3$, which can be the same or different, represent hydrogen, an alkyl group, an aryl group, $-OR^5$, $-NHR^5$, $-NR^5R^5$, or $-SR^5$, wherein $R^5$, which is the same or different, represents an alkyl group or an aryl group; and SFR represents a stable free radical. Also disclosed is a modified particle or aggregate having attached a group having the formula:

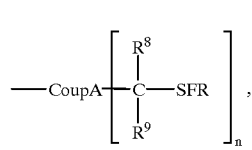

(II)

wherein CoupA represents a Si-containing group, a Ti-containing group, or a Zr-containing group; $R^8$ and $R^9$, which can be the same or different, represent hydrogen, an alkyl group, an aryl group, $-OR^{10}$, $-NHR^{10}$, $-NR^{10}R^{10}$, or $-SR^{10}$, wherein $R^{10}$ represents an alkyl group or an aryl group; SFR represents a stable free radical; and n is an integer of from 1 to 3. A modified particle having an attached $-SFR$ or $-X-SFR$ is additionally disclosed. Also, modified particles with attached polymers are also disclosed as well as methods of making the modified products.

50 Claims, No Drawings

U.S. PATENT DOCUMENTS

| | | | |
|---|---|---|---|
| 4,320,011 | 3/1982 | Sato et al. ................................. | 210/694 |
| 4,366,139 | 12/1982 | Kühner et al. ........................... | 423/449 |
| 4,452,638 | 6/1984 | Gallus . | |
| 4,530,961 | 7/1985 | Nguyen et al. . | |
| 4,537,633 | 8/1985 | Hong . | |
| 4,597,794 | 7/1986 | Ohta et al. . | |
| 4,820,751 | 4/1989 | Takeshita et al. ....................... | 523/215 |
| 4,831,011 | 5/1989 | Oikawa et al. .......................... | 502/406 |
| 5,130,363 | 7/1992 | Scholl et al. ............................. | 524/392 |
| 5,159,009 | 10/1992 | Wolff et al. .............................. | 106/475 |
| 5,184,148 | 2/1993 | Suga et al. . | |
| 5,190,582 | 3/1993 | Shinozuka et al. . | |
| 5,281,261 | 1/1994 | Lin . | |
| 5,282,887 | 2/1994 | Gay et al. ................................. | 106/261 |
| 5,322,912 | 6/1994 | Georges et al. .......................... | 526/204 |
| 5,401,313 | 3/1995 | Supplee et al. ........................... | 106/475 |
| 5,401,804 | 3/1995 | Georges et al. .......................... | 525/267 |
| 5,412,047 | 5/1995 | Georges et al. .......................... | 526/204 |
| 5,449,724 | 9/1995 | Moffat et al. ............................. | 526/204 |
| 5,498,679 | 3/1996 | Moffat et al. ............................. | 526/204 |
| 5,530,079 | 6/1996 | Veregin et al. ....................... | 526/219.3 |
| 5,545,504 | 8/1996 | Keoshkerian et al. ................... | 430/137 |
| 5,554,739 | 9/1996 | Belmont .................................. | 534/885 |
| 5,559,169 | 9/1996 | Belmont et al. .......................... | 523/215 |
| 5,571,311 | 11/1996 | Belmont et al. . | |
| 5,575,845 | 11/1996 | Belmont et al. .......................... | 106/712 |
| 5,610,250 | 3/1997 | Veregin et al. ....................... | 526/219.3 |
| 5,630,868 | 5/1997 | Belmont et al. ...................... | 106/31.75 |
| 5,654,357 | 8/1997 | Menashi et al. .......................... | 524/495 |
| 5,672,198 | 9/1997 | Belmont . | |
| 5,698,016 | 12/1997 | Adams et al. ........................... | 106/31.6 |
| 5,707,432 | 1/1998 | Adams et al. ........................... | 106/31.6 |
| 5,713,988 | 2/1998 | Belmont et al. ......................... | 106/31.6 |
| 5,714,993 | 2/1998 | Keoshkerian et al. ..................... | 347/95 |
| 5,723,511 | 3/1998 | Kaznaier et al. ........................... | 522/35 |
| 5,728,747 | 3/1998 | Kaznaier et al. ........................... | 522/11 |
| 5,749,950 | 5/1998 | Mahmud et al. ........................ | 106/31.6 |

FOREIGN PATENT DOCUMENTS

| | | |
|---|---|---|
| 1331889 | 5/1963 | France . |
| 1948443 | 4/1971 | Germany . |
| 23 55 758 | 5/1975 | Germany . |
| 56-078629 | 6/1981 | Japan . |
| 59/82467 | 5/1984 | Japan . |
| 62/250073 | 10/1987 | Japan . |
| 6067421 | 3/1994 | Japan . |
| 862018 | 3/1961 | United Kingdom . |
| 1191872 | 5/1970 | United Kingdom . |
| 2 188 311A | 9/1987 | United Kingdom . |
| WO 91/02034 | 2/1991 | WIPO . |
| WO 91/15425 | 10/1991 | WIPO . |
| WO 92/13983 | 8/1992 | WIPO . |
| WO 95/01838 | 1/1995 | WIPO . |
| WO 96/18688 | 6/1996 | WIPO . |
| WO 96/18694 | 6/1996 | WIPO . |
| WO 96/18695 | 6/1996 | WIPO . |
| WO 96/18696 | 6/1996 | WIPO . |
| WO 96/37547 | 11/1996 | WIPO . |

OTHER PUBLICATIONS

Derwent Abstract, AN No. 82–28019E, "Penetrating Flexographic Print Ink Based Polyacrylic Resin," Oct. 17, 1979, SU,A, 834062.

Derwent Abstract, AN No. 86–335147, "Wear Resistant Rubber Composition for Tire Tread Rubber," Apr. 30, 1985, JPA 61–250042, Nov. 1986.

Derwent Abstract, AN N. 93–261471, "Carbon Black for Coating Magnetic Recording Media—Having Silicon Dioxide Coating, Giving Good Dispersibility, Lubrication, etc.", Japanese Patent Application No. 5178604, Jul. 20, 1993.

Derwent Abstract, AN No. 95–183086, "Tire Treated Rubber Composition," Apr. 18, 1995, JPA 07102116.

Derwent Abstract, AN No. 94–189154, "Ink for Writing Implements," May 10, 1994, JPA 61–28517A.

Patent Abstracts of Japan Publication No. JP7102116, "Rubber Composition for Tire Tread," Apr. 18, 1995.

Moschopedis, et al., "The Reaction of Diazonium Salts with Humic Acids and Coals: Evidence for Activated Methylene Bridges in Coals and Humic Acids," *Fuel*, vol. 43, No. 4, pp. 289–298, 1964, no month.

Roberts et al., *Basic Principles of Organic Chemistry*, Second Edition, W.A. Benjamin, Inc., Pub., p. 1080, no date available.

Zoheidi et al., "Role of Oxygen Surface Groups in Catalysis of Hydrogasification of Carbon Black by Potassium Carbonate," *Carbon*, vol. 25, No. 6, pp. 809–819, 1987, no month available.

International Search Report for PCT/US 97/08049 mailed Sep. 15, 1997.

Delamar et al., J. Am. Chem. Soc. 1992, 114, 5883–5884, no month available.

PARTICLE HAVING AN ATTACHED STABLE FREE RADICAL AND METHODS OF MAKING THE SAME

BACKGROUND OF THE INVENTION

The present invention relates to particles, such as carbon black, having an attached stable free radical which permits the formation of blocked radical sources. The present invention further relates to methods of preparing and using such modified particles.

The role of carbon black as a thermal stabilizer in polymeric systems is discussed by W. L. Hawkins, R. H. Hansen, W. Matreyek, F. H. Winslow; *J. Applied Polymer Science*, vol. 1, pages 37–42, 1959; J. T. Cruver, K. W. Rollmann: *J. Applied Polymer Science*, vol. 8, pages 1169–83, 1964, and by G. Ivan, M. Giurgina: *Revue Roumaine de Chemie*, vol. 29, number 8, pages 639–646, 1984. In each discussion the mechanism is through phenolic and quinone oxygen groups on the carbon black surface behaving either as radical traps or peroxide decomposers. One skilled in the art, however, would consider these sites unavailable as initiating sites for polymerization processes.

Belmont et al. (J. A. Belmont, J. M. Funt: International Rubber Conference, Essen, Germany, June 24–27 1991) identified the presence of peroxide groups, typically in the range 0.1 to 0.4 micromoles/sq meter, on the carbon black surface. However, the majority (greater than 80%) of the peroxide groups are thermally stable to heat treatment at 200° C. and hence cannot be considered to be potential initiating sites for radical polymerization.

Tsubokawa et al. (K. Fujiki, N. Tsubokawa, Y. Sone: *Polymer J.*, vol. 22, number 8, pages 661–70, 1990, and N. Tsubokawa: *Prog. Polymer Science*, vol. 17, pages 417–70, 1992) discuss growing polymers from an activated carbon black surface by first attaching a reactive group via the oxygen groups on the carbon black surface. Typical examples include the use of glycidyl methacrylate where the glycidyl group reacts with phenolic hydroxyl groups on the carbon black surface providing a vinyl functionality; the reaction of 4,4' azo bis-(4-cyanovaleric acid) whereby the isocyanate group reacts with phenolic hydroxyl groups and subsequent heating decomposes the azo group to generate an alkyl radical; and the reaction of the phenolic hydroxyl groups with butyl lithium which can then be used as an initiation site for anionic polymerization.

All of these approaches require the presence of oxygen groups on the carbon black surface. Since the level of reactive hydroxyl and carboxylic acid groups, relative to the above approaches, present on a typical furnace or thermal carbon black is typically 0.01 to 0.1 micromoles/sq meter, the number of potential initiation sites is quite low.

Further, subsequent polymerization from these activated sites will most likely occur in the normal manner for free radical polymerization with the chains being irreversible terminated by chain combination reactions, combination with unreacted oxygen groups on the carbon black surface, and/or the addition of chain stoppers. In all cases the polymerization cannot be reinitiated. Accordingly, there is a need to provide particles with attached stable free radicals which overcome the above-described limitations.

SUMMARY OF THE INVENTION

A feature of the present invention is to provide means of attaching a stable free radical onto a particle.

Another feature of the present invention is to provide modified particles having an attached stable free radical and to further provide modified particles having an attached polymer which is capped with the stable free radical.

Other features of the present invention relate to the making and using of such modified particles.

Additional features and advantages of the present invention will be set forth in part in the description which follows, and in part will be apparent from the description, or may be learned by practice of the present invention.

To achieve these and other advantages and in accordance with the purpose of the present invention, as embodied and broadly described herein, the present invention relates to a modified particle which includes a particle having an attached group having the formula:

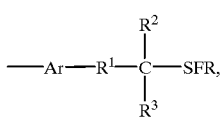

(I)

wherein Ar represents an aromatic group; $R^1$ represents a bond, an arylene group, an alkylene

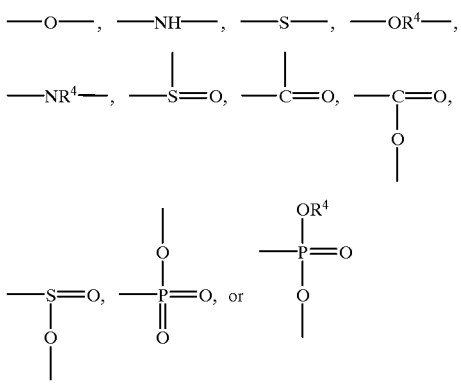

wherein $R^4$ is an alkyl or alkylene group or an aryl or arylene group; $R^2$ and $R^3$, which can be the same or different, represent hydrogen, an alkyl group, an aryl group, $-OR^5$, $-NHR^5$, $-NR^5R^5$ or $-SR^5$, wherein $R^5$, which can be the same or different, represents hydrogen, an alkyl group or an aryl group; and SFR represents a stable free radical.

The present invention further relates to a modified particle or aggregate wherein the particle or aggregate is a carbon-metal phase aggregate, a carbon-silicon containing species phase aggregate, a metal oxide, or a metal hydroxide. Attached to the particle or aggregate is a group having the formula:

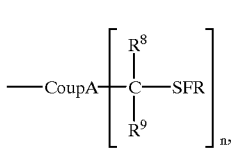

(II)

wherein CoupA represents a Si-containing group, a Ti-containing group, or a Zr-containing group; $R^8$ and $R^9$, which can be the same or different, represent hydrogen, an alkyl group, an aryl group, $-OR^{10}$, $-NHR^{10}$, $-NR^{10}OR^{10}$, or $-SR^{10}$, wherein $R^{10}$, which can be the same or different, represents hydrogen, an alkyl group or an aryl group; SFR represents a stable free radical, and n is an integer of from 1 to 3.

The present invention further relates to a modified particle with an attached polymer wherein the modified particle has an attached group having the formula:

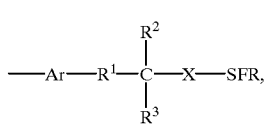
(III)

wherein X represents a polymer formed from at least one polymerizable vinyl or diene based monomer, Ar represents an aromatic group; $R^1$ represents a bond, an arylene group, an alkylene

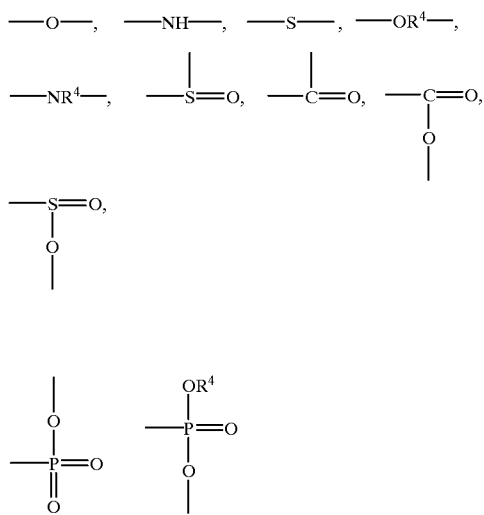

wherein $R^4$ is an alkyl or alkylene group or an aryl or arylene group; $R^2$ and $R^3$, which can be the same or different, represent hydrogen, an alkyl group, an aryl group, —$OR^5$, —$NHR^5$, —$NR^5R^5$ or —$SR^5$, wherein $R^5$, which can be the same or different, represents an alkyl group or an aryl group; and SFR represents a stable free radical.

The present invention also relates to another modified particle having an attached polymer. The particle is a carbon-metal phase aggregate, a carbon-silicon containing species phase aggregate, a metal oxide, or a metal hydroxide. Attached to the particle is a group having the formula:

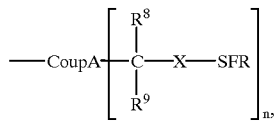
(IV)

wherein CoupA represents a Si-containing group, a Ti-containing group, or a Zr-containing group; $R^8$ and $R^9$, which can be the same or different, represent hydrogen, an alkyl group, an aryl group, —$OR^{10}$, —$NHR^{10}$, —$NR^{10}R^{10}$, or —$SR^{10}$, wherein $R^{10}$, which can be the same or different, represents an alkyl group or an aryl group; SFR represents a stable free radical, X is a polymer formed from at least one polymerizable monomer, and n is an integer of from 1 to 3.

The present invention, in addition, relates to a method for preparing and using these various modified particles. The method includes reacting a particle having an attached vinyl substituted aromatic group with a reactive free radical source and a stable free radical source to form a reaction product. The present application further relates to forming the modified particles with an attached polymer by reacting the reaction product with a polymerizable monomer.

The present invention, in addition, relates to a modified particle which includes a particle having an organic group having a —SFR group, where the organic group is directly attached to the particle. The modified particle can also be a particle having an organic group having an —X—SFR group, where the organic group is directly attached to the particle.

It is to be understood that both the foregoing general description and the following detailed description are exemplary and explanatory only and are intended to provide further explanation of the present invention, as claimed.

DETAILED DESCRIPTION OF THE PRESENT INVENTION

In one embodiment, the present invention relates to a modified particle comprising a particle having attached a group having the formula:

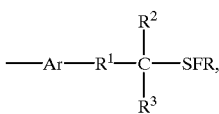
(I)

wherein Ar represents an aromatic group which is attached to the particle; $R^1$ represents a bond,

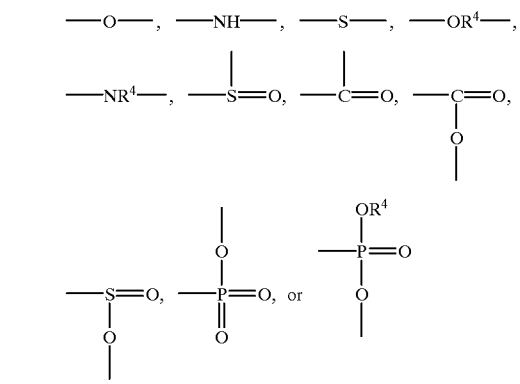

wherein $R^4$ is an alkyl or alkylene group or an aryl or arylene group; $R^2$ and $R^3$, which can be the same or different, represent hydrogen, an alkyl group, an aryl group, —$OR^5$, —$NHR^5$, —$NR^5R^5$, or —$SR^5$, wherein $R^5$, which can be the same or different, represents an alkyl group or an aryl group; and SFR represents a stable free radical.

The particle, which is modified, can be any particle capable of having a group represented by any one of formulas described herein attached thereto, such as formula (I)–(IV). Preferably, the particle has a carbon reactive site (C—), since in a preferred embodiment for the groups of formula (I) and (III), —SFR and —X—SFR are preferably attached through a carbon bond on the particle. The particle, for instance, can be carbon products, metal oxides (e.g., silica), metal hydroxides, multi-phase aggregates comprising a carbon phase and a silicon-containing species phase, multi-phase aggregates comprising a carbon phase and a metal-containing species phase, and the like. The carbon may be of the crystalline and/or amorphous type. Examples of carbon products include but are not limited to, graphite, carbon black, vitreous carbon, activated charcoal, activated carbon, carbon fiber, and mixtures thereof. Finely divided forms of the above are preferred. Most preferably, the particle is a carbon product, and most preferably carbon black.

The multi-phase aggregate containing the carbon phase and the silicon-containing species phase can also be considered a silicon-treated carbon black aggregate and the multi-phase aggregate containing a carbon phase and a metal-containing species phase can be considered to be a metal-treated carbon black aggregate as long as one realizes that in either case, the silicon-containing species and/or metal-containing species are a phase of the aggregate just like the carbon phase. The multi-phase aggregates do not represent a mixture of discrete carbon black aggregates and discrete silica or metal aggregates. Rather, the multi-phase aggregates used in the present invention include at least one silicon-containing or metal-containing region concentrated at or near the surface of the aggregate (but put of the aggregate) and/or within the aggregate.

The aggregate, thus contains at least two phases, one of which is carbon and the other of which is a silicon-containing species, a metal-containing species, or both. The silicon-containing species that can be a part of the aggregate is not attached to a carbon black aggregate like a silica coupling agent, but actually is part of the same aggregate as the carbon phase. For instance, when the multi-phase aggregate having a carbon phase and a silicon-containing species phase is examined under STEM-EDX, the silicon signal corresponding to the silicon-containing species is found to be present in individual carbon black aggregates. By comparison, for example, in a physical mixture of silica and carbon black, STEM-EDX examination reveals distinctly separate silica and carbon black aggregates.

The metal-treated carbon blacks are aggregates containing at least a carbon phase and a metal-containing species phase. The metal-containing species include compounds containing aluminum, zinc, magnesium, calcium, titanium, vandium, cobalt, nickel, zirconium, tin, antimony, chromium, neodymium, lead, tellurium, barium, cesium, iron, and molybdenum. Preferably, the metal-containing species phase is an aluminum- or zinc-containing species phase. The metal-containing species phase can be distributed through at least a portion of the aggregate and is an intrinsic part of the aggregate.

Further, it is within the bounds of the present invention to have a metal-treated carbon black containing more than one type of metal-containing species phase or the metal-treated carbon black can also contain a silicon-containing species phase and/or a boron-containing species phase. For example, the metal-treated carbon black of the present invention can have an aggregate comprising a carbon phase, an aluminum-containing species phase, and a zinc-containing species phase. Accordingly, the multi-phase aggregates used in the present invention can have two or more different types of metal-containing species phases and/or additional non-metal species phases.

Preferably, for purposes of the present invention, the amount of elemental silicon and/or elemental metal present in the multi-phase aggregate is from about 0.1 to about 25 wt. %, more preferably, from about 0.5 wt. % to about 10 wt. %, and most preferably from about 0.2 wt. % to about 5.4 wt. %, by weight of the aggregate.

The details of making the multi-phase aggregates are explained in U.S. patent application Ser. No. 08/446,141 now U.S. Pat. No. 5,830,930, filed May 22, 1995; Ser. No. 08/446,142 U.S. Pat. No. 5,877,238, filed May 22, 1995; Ser. No. 08/528,895, filed Sep. 15, 1995 (now abandoned); and Ser. No. 08/750,017, filed Nov. 22, 1996, which is a National Phase Application of PCT No. WO 96/37547, filed May 21, 1996, and U.S. patent application Ser. No. 08/828,785, filed Mar. 27, 1997. All of these patent applications are hereby incorporated in their entireties herein by reference.

A silica-coated carbon product can also be used as the particle, which is described in PCT Application No. WO 96/37547, published Nov. 28, 1996, and is hereby incorporated in its entirety herein by reference.

Particles useful for the present invention may, for example, have primary particles sizes in the general range of from about 10 nm to about 500 nm, and preferably from about 10 nm to about 250 nm, and primary aggregate sizes in the general range of from about 50 nm to about 100 microns, preferably from about 50 nm to about 10 microns, still more preferably from about 75 nm to about 1 micron. The BET surface area of these particles can be any suitable surface area and preferably ranges from about 10 $m^2/g$ to about 2000 $m^2/g$ and more preferably, from about 10 $m^2/g$ to about 1,000 $m^2/g$, and still more preferably from about 50 $m^2/g$ to about 500 $m^2/g$; and the particle structure preferably ranges from about 10 cc/100 g to about 1000 cc/g, more preferably, from about 50 cc/100 g to about 200cc/100 g.

The number of SFR groups directly attached to the particle prior to polymerization can be any amount. For instance, the number of —SFR groups may range from about 0.01 mmole/g (of particle) to about 10 mmole/g, preferably from about 0.1 mmole/g to about 4 mmole/g, and still more preferably from about 0.5 mmole/g to about 3 mmole/g.

When the particle is a multi-phase aggregate, like a carbon phase and a silicon-containing species phase, preferably the group of formula (I) or (III) is attached at least, if not exclusively, on the carbon phase.

With regard to the aromatic group (Ar), any aromatic group may be used. Unlike the polymerizable monomer discussed later, the aromatic group is not a polymer and is not polymerized. Examples include, but are not limited to, arylene groups. Preferred arylene groups include, but are not limited to, phenylene and naphthalene groups.

With respect to $R^1$, preferred arylene groups include, but are not limited to, benzene ring containing groups. Preferred alkylene groups include, but are not limited to, $C_1$–$C_{18}$ alkylene-containing groups. These groups can be linear, branched, or unsaturated. These examples of arylene and alkylene groups can also be considered examples of $R^4$. Preferred alkyl groups for $R^4$ are $C_1$–$C_{20}$ alkyl groups, more preferably $C_1$–$C_5$ alkyl groups and preferred aryl groups are phenyl, biphenyl, and naphthyl.

With respect to $R^2$ and $R^3$, which can be the same or different, examples of alkyl groups (e.g. $C_1$–$C_{20}$ alkyl group) include, but are not limited to, methyl, ethyl, propyl, butyl, and the like. Preferably, the alkyl group is a $C_1$–$C_5$ alkyl group. Examples of aryl groups include but are not limited to phenyl, biphenyl, and naphthyl. The alkyl and aryl groups mentioned here as well as the arylene and alkylene groups mentioned throughout can be unsubstituted or substituted for purposes of the present invention. $R^5$ can be the same type of alkyl and aryl groups mentioned above with respect to $R^2$ and $R^3$.

SFR, which is the stable free radical, can be any radical capable of capping the remaining portion of the group attached onto the particle. Examples of the SFR include, but are not limited to, nitroxide free radicals such as 2,2,5,5- tetramethyl-pyrrolidinyloxy and 2,2,6,6-tetramethyl-piperindinyloxy, organic hydrazyl compounds, organic verdazyl compounds, organic aroxyl compounds (e.g., 2,4,6 tri-tertiary butyl phenoxy radical, gaivinoxyl (2,6 ditertiary butyl alpha 3,5 ditertiary butyl oxo 2,5 cyclohexadiene-1 ylidene para tolyoxy) radical), aryl alkyl or aryl cycloalkyl where the unpaired electron is on a carbon atom, substituted triphenyl methyl, substituted triphenyl amine, and derivatives of these compounds.

The SFR used in the present invention preferably has the formulas:

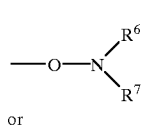
(V)

or

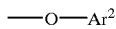
(VI)

wherein $R^6$ and $R^7$, which can be the same or different, represent a substituted or unsubstituted alkyl or cycloalkyl group; and $Ar^2$ represents a substituted or unsubstituted aromatic group. Representative examples of the alkyl and aromatic groups can be the same as described above with respect to the substitutents $R^2$ and $R^3$.

Another embodiment of the present invention relates to a modified particle or aggregate having a group of formula (II) attached thereto. The particle can be a metal oxide, a metal hydroxide, an aggregate comprising a carbon phase and a metal-containing species phase, or an aggregate comprising a carbon phase and a silicon-containing species phase. Attached to this particle or aggregate is a group having the formula:

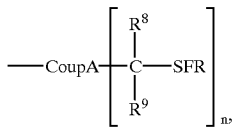
(II)

wherein CoupA represents a Si-containing group, a Ti-containing group, or a Zr-containing group; $R^8$ and $R^9$, which can be the same or different, represent hydrogen, an alkyl group, an aryl group, $-OR^{10}$, $-NHR^{10}$, $-NR^{10}R^{10}$, or $-SR^{10}$, wherein $R^{10}$ represents an alkyl group or an aryl group; SFR represents a stable free radical, and where n is an integer of from 1 to 3. Preferably, CoupA is attached to the particle or aggregate, especially in the case of a Si-containing group, via an oxygen radical which can form a part of a CoupA.

Examples of Si-containing groups include, but are not limited to, dimethylsilylmethyl, dialkoxysilylmethyl, and the like. Examples of Ti-containing groups include, but are not limited to, alpha substituted tri-acetyl titanate and the like. Examples of Zr-containing groups include, but are not limited to, dialpha methoxy neopentylzirconate and the like.

Examples of the substituents $R^8$ and $R^9$ can be the same as the substituents $^2$ and $R^3$ mentioned above. Likewise, examples of the substituent $R^{10}$ can be the same as the substituent $R^5$ discussed above. Also, the SFR is the same as discussed above.

The modified particles having the attached group of the formulas, such as formula (I), can be made in the following manner. A particle, such as carbon black, can first have a vinyl substituted aromatic group attached to the particle. This attachment can be accomplished by the methods described in PCT International Application No. WO 96/18688 and U.S. Pat. Nos. 5,630,868; 5,559,169; 5,571,311; 5,851,280; and 5,559,169, all of which are hereby incorporated in their entireties by reference herein.

The particle having the attached vinyl substituted aromatic group is then reacted with a reactive free radical source and a stable free radical source for a sufficient time and at a sufficient temperature to form the modified particle having the attached group, like that of formula I. The molar ratio of the reactive free radical source to the stable free radical source is from about 0.7 to about 2.0, and preferably from about 0.9 to about 1.1. Examples of the reactive free radical source include but are not limited to radicals generated from organic peroxides such as benzoyl peroxides and azo initiators such as azobisisobutyronitrile, and the like. The reactive free radical source is present in amounts sufficient to react with the vinyl aromatic group present on the particle. Preferably, the amount of the reactive radical source is from about 0.01 mmoles/g (of particle) to about 10 mmoles/g and more preferably from about 0.01 to about 5 mmoles/g.

Alternatively, the modified particles of the present invention can be made by first forming the groups of the formulas described above, such as formula (I). Preferably, the stable free radical group is attached in the meta or para position of the aromatic group. This group is then attached to the particle by a diazonium treatment in the manner described in the above referenced patents and patent applications, where a diazonium salt will first be formed containing a group of one of the formulas described above in the manner described in the above-referenced patents. The groups of the formulas can be then subsequently attached to the particle. In a less preferred way, the formulas of the present invention can be attached to the particle through a hydroxyl or carbonoyl group present on the particle.

Also, the modified particle of the present invention can be formed by attaching a stable free radical compound containing at least one alkoxy silyl, alkoxy titanyl, or alkoxy zirconyl group to the particle which, in this particular process is preferably a metal oxide or metal hydroxide, or a carbon surface. This particular embodiment would attach a group of formula (II) or (IV) to a particle.

In another process, the modified particle can be formed by first taking an aromatic group and reacting it with a compound to form the groups of the formulas described above except for the presence of the —SFR group. In other words, a group having the formula Ar—$R^1$—$CR^2R^3$ would first be formed and then the —SFR would be attached to this group to form a group of formula (I) of the present invention which can then be attached to the particle. In this process, $R^2$ and $R^3$ are preferably hydrogen.

Alternatively, the process of making the modified particles of the present invention can be a three step process where Ar is first attached to the particle and then the group having the formula $R^1C$—$R^2R^3$ can be attached to the aromatic group. Then in a third step, the —SFR can be attached to the $R^1$—C—$R^2R^3$ group.

Also, in making the modified particles having the attached group of one the formulas described above, an aliphatic vinyl group can be attached to the particle surface by a diazotisation of a vinyl substituted amino aromatic compound, or a vinyl substituted alkoxy silyl, titanyl, or zirconyl derivate. The vinyl group is then reacted with an organic peroxide and a stable free radical such that the organic peroxide and stable free radical are present in an amount sufficient to react with at least one percent of the vinyl groups and preferably from about 50 to about 100% of the vinyl groups and the mole ratios of the organic peroxide to stable free radical are preferably from about 0.5:1 to about 1:1.

The modified particles of formula (II) can be made in the following manner. The aggregate comprising a carbon phase and a metal-containing species phase can be made as described in U.S. patent application Ser. No. 08/828,725, hereby incorporated herein by reference. The aggregate comprising a carbon phase and a metal containing species phase can be made as described in U.S. patent application Ser. No. 08/446,141 (now U.S. Pat. No. 5,830,930) and Ser. No. 08/750,017. The aggregate or particle can then be reacted with a coupling agent by adding the coupling agent to the aggregate in a medium and mixing. Then, the aggregate or particle having the attached coupling group can be reacted with a reactive radical source and stable free radical source as described above.

For purposes of the above-described reactions, the reaction should occur for a time and temperature sufficient to form the attached group onto the particle or aggregate. Generally, this time is from about 3 minutes to about 96 hours and more preferably from about 1 hour to about 24 hours. The temperature of the reaction is dependent on the half-life of the peroxide, preferably from about 50° C. to about 200° C., and more preferably from about 75° C. to about 125° C.

With the modified particles described above, polymers can be attached onto these attached groups by reacting these modified particles or aggregates with a polymerizable monomer such as a vinyl or diene containing monomer. Specific examples of such monomers include, but are not limited to styene, isoprene, butadiene, chloromethylstyrene, methyl methacrylate, and butyl methacrylate, as well as acrylic acid and esters of acrylic acid and methacrylic acid and esters of methacrylic acid. Mixtures of two or more monomers can be also used.

The polymerization reaction is conducted under conditions which permits the polymerization of the monomer so that it forms a part of the attached group onto the particle or aggregate. These conditions are preferably heating modified particles with a monomer above 80° C., preferably from about 120° C. to about 150° C., optionally in the presence of a solvent. The reaction can be ended by lowering the temperature below 80° C. The polymer-modified particle can then be subjected to distillation, steam stripping, or precipitation or other known methods in order to remove residual monomers and solvents.

The polymerization reaction thus can produce any length of polymer on the modified particle or aggregate. For example, polymers having average molecular weights, preferably ranging from about 1,000 to about 1,000,000 can be made. The polymers can be any type, such as homopolymers, co-polymers, ter-polymers, or higher chain polymers. The polymers can also be block, graft, or random-type polymers.

Once the polymerization occurs, the modified particle will have a group attached having the formula:

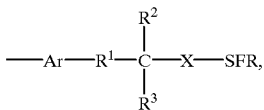

wherein the substituents are the same as described earlier for formula (I) and X is a polymer formed from at least one polymerizable monomer.

Similarly, when the modified particle or aggregate having a group of formula (II) is polymerized by the introduction of one or more monomers, the group attached to the particle or aggregate will have the formula:

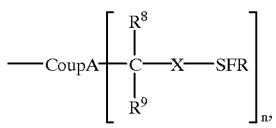

wherein the substituents are the same as described in formula (II) and X is a polymer formed from at least one polymerizable monomer.

In another embodiment, a modified particle has an organic group containing a —SFR group directly attached to the particle. Preferably, the —SFR group is directly attached to the particle. The —SFR group and particle can be the same as discussed above. This type of modified particle can be prepared by heating a particle, like carbon black, with a organic group comprising a stable free radical in a solvent, such as toluene and preferably, in an inert atmosphere. With this modified particle having an attached organic group having a —SFR group, polymers can be attached onto the —SFR group by reacting the modified particle with a polymerizable monomer as discussed above using the same procedure.

The modified particles of the present invention can form part of a polymeric composition and be present with other ingredients commonly used and found in polymeric compositions.

The modified particle of the present invention can be used in a variety of applications. For instance, it can be used in coating or ink compositions, such as printing inks and ink jet inks, toners, automobile coatings, and the like. Also, the modified particles can be used as reinforcers for compositions, such as polymeric compositions and can also serve as impact modifiers, or as agents used to increase compatibility of a polymeric composition.

The present invention will be further clarified by the following examples, which are intended to be purely exemplary of the invention.

EXAMPLES

Example 1

Attachment of 2,2,6,6 tetramethyl piperidinyloxy free radical (TEMPO) to carbon black.

TEMPO and carbon black grade Vulcan 7H were added to toluene and heated under an inert atmosphere at 130° C. for 96 hours. The carbon black was filtered from the toluene, washed with deionized water, and dried.

Kjeld analysis of the resultant carbon black indicated that the nitrogen content of the carbon black had increased from 0.040% to 0.57% by weight. This equates to 0.09 micromoles of TEMPO attachment per sq meter of carbon black surface area.

Comparing this example with attachment of sulfanic acid via a diazotization process, this equates to about 3% of surface coverage.

Example 2

The TEMPO modified carbon black prepared in Example 1 was combined with freshly distilled styrene and heated for various time intervals indicated in the Table under an inert argon atmosphere.

After completion of the specific time interval, the reaction was terminated by removing the heat source. The treated carbon black samples were filtered and extracted under Soxhlet refluxing conditions with tetrahydrofuran for 48 hours.

Analysis of the treated carbon black samples for organic content was carried out using TGA analysis and heating rate of 20° C./minute under a nitrogen flow rate of 50 ml/minute.

| Temperature (° C.) | Time (hours) | organic content (% by weight of carbon black) |
| --- | --- | --- |
| 125 | 16 | 1.12% |
| 150 | 16 | 2.46% |
| 130 | 72 | 16.5% |

Example 3

Vinyl benzene functionalized carbon black prepared by the diazotization of amino styrene (using the procedure in U.S. Pat. No. 5,571,311) was reacted with benzoyl peroxide and TEMPO for 16 hours at 70° C. under an argon atmosphere. The resultant carbon black was extracted with tetrahydrofuran and submitted for nitrogen analysis using the Kjeld technique, which indicates 2 micromoles of TEMPO attachment per sq. meter of carbon black surface area.

Example 4

The modified carbon black described in Example 3 was heated with styrene under an inert argon atmosphere for 72 hours at 130° C. The reacted carbon black was extracted with tetrahydrofuran under Soxhlet reflux conditions for 48 hours to remove any unattached polystyrene. TGA analysis indicated that the reacted carbon black contained 35% (by weight of carbon black) organic material.

Example 5 (Comparative)

Using the procedure described by Georges in Macromolecules, vol. 26, pages 2987–8, (1993), a TEMPO terminated polystyrene was produced with a molecular weight, determined by GPC, of 11,200 and a polydispersity of 1.3.

Example 6 (Comparative)

The TEMPO terminated polystyrene produced in Example 5 was heated with carbon black in toluene under an inert argon atmosphere, and under the conditions set forth in the Table below. The resultant carbon black was extracted with tetrahydrofuran to remove unattached polymer, and the residual polymer attached to carbon particle was determined by TGA analysis.

| Carbon Black Amount (by weight) | Polystyrene Amount (by weight) | Temperature (° C.) | Time (hours) | Polymer Attachment by TGA (by weight) |
| --- | --- | --- | --- | --- |
| 10% | 90% | 140 | 44 | 9.4% |
| 50% | 50% | 125 | 23 | 6.2% |

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A modified particle comprising a particle having attached a group having the formula:

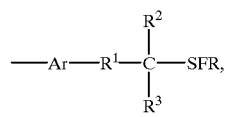

(I)

wherein Ar represents an aromatic group; $R^1$ represents a bond, an arylene group, an alkylene

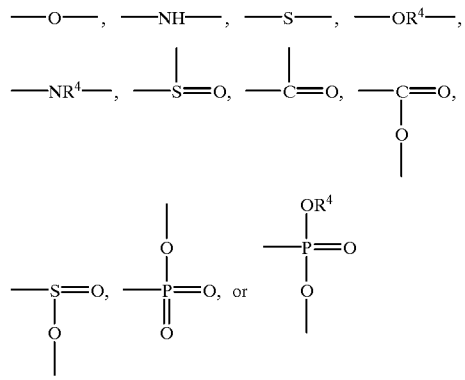

wherein $R^4$ is an alkyl or alkylene group or an aryl or arylene group; $R^2$ and $R^3$, which can be the same or different, represent hydrogen, an alkyl group, an aryl group, —$OR^5$, —$NHR^5$, —$NR^5R^5$, or —$SR^5$, wherein $R^5$, which is the same or different, represents an alkyl group or an aryl group; and SFR represents a stable free radical, wherein said modified particle is a carbon product, a metal oxide, a metal hydroxide a multi-phase aggregate comprising a carbon phase and a silicon-containing species phase, a multi-phase aggregate containing a carbon phase and a metal-containing species phase, or mixtures thereof.

2. The modified particle of claim 1, wherein said SFR has the formula:

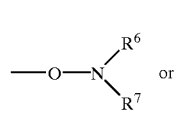

(V)

-continued $$—O—Ar^2 \quad (VI)$$

wherein $R^6$ and $R^7$, which can be the same or different, represent a substituted or unsubstituted alkyl or cycloalkyl group; and $Ar^2$ represents an aromatic group.

3. The modified particle of claim 1, wherein said particle is a carbon product, a metal oxide, a metal hydroxide, or mixtures thereof.

4. The modified particle of claim 1, wherein said particle is graphite, vitreous carbon, activated charcoal, carbon fiber, activated carbon, or mixtures thereof.

5. The modified particle of claim 1, wherein said particle is carbon black.

6. The modified particle of claim 5, wherein said particle is an aggregate comprising a metal-containing species phase and a carbon phase.

7. The modified particle of claim 1, wherein said particle is an aggregate comprising a silicon-containing species phase and a carbon phase.

8. The modified particle of claim 1, wherein said SFR is 2,2,5,5-tetramethyl-1-pyrrolidinyloxy, 2,2,6,6-tetramethyl-1-piperindinyloxy, or derivatives thereof.

9. A method for preparing the modified particle of claim 1, comprising reacting a particle having an attached vinyl substituted aromatic group with a reactive free radical source and a stable free radical source.

10. A coating or ink composition comprising an aqueous or non-aqueous solvent, and the modified particle of claim 1.

11. A modified particle or aggregate comprising a) an aggregate comprising a carbon phase and a metal-containing species phase, an aggregate comprising a carbon phase and a silicon-containing species phase, a metal oxide, or a metal hydroxide and b) attached to said particle or aggregate, a group having the formula:

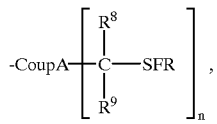

(II)

wherein CoupA represents a Si-based group, a Ti-based group, or a Zr-based group; $R^8$ and $R^9$, which can be the same or different, represent hydrogen, an alkyl group, an aryl group, $—OR^{10}$, $—NHR^{10}$, $—NR^{10}OR^{10}$, or $—SR^{10}$, wherein $R^{10}$, which is the same or different, represents an alkyl group or an aryl group; SFR represents a stable free radical; and or is an integer of from 1 to 3.

12. The modified particle or aggregate of claim 11, wherein said metal-containing species phase comprises a magnesium-containing species phase, a calcium-containing species phase, a titanium-containing species phase, a vanadium-containing species phase, a cobalt-containing species phase, a nickel-containing species phase, a zirconium-containing species phase, a tin-containing species phase, an antimony-containing species phase, a chromium-containing species phase, a neodymium-containing species phase, a lead-containing species phase, a tellurium-containing species phase, a barium-containing species phase, a cesium-containing species phase, an iron-containing species phase, a molybdenum-containing species phase, or mixtures thereof.

13. The modified particle or aggregate of claim 11, wherein said metal-containing species phase comprises an aluminum-containing species phase.

14. The modified particle or aggregate of claim 11, wherein said metal-containing species phase comprises a zinc-containing species phase.

15. The modified particle or aggregate of claim 11, wherein said SFR is 2,2,5,5-tetramethyl-1-pyrrolidinyloxy, 2,2,6,6-tetramethyl-1-piperindinyloxy, or derivatives thereof.

16. The modified particle or aggregate of claim 11, wherein said particle or aggregate is an aggregate comprising a carbon phase and a metal-containing species phase or an aggregate comprising a carbon phase and silicon-containing species phase.

17. A modified particle comprising a particle having attached a group having the formula:

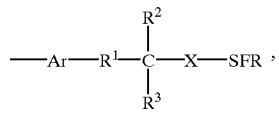

(III)

wherein Ar represents an aromatic group; $R^1$ represents a bond, an arylene group, an alkylene

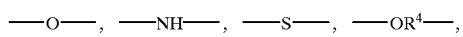

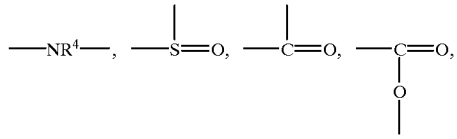

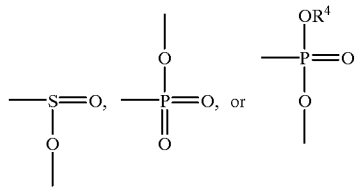

wherein $R_4$ is an alkyl or alkylene group or an aryl or arylene group; $R^2$ and $R^3$, which can be the same or different, represent hydrogen, an alkyl group, an aryl group, $—OR^5$, $—NHR^5$, $—NR^5R^5$, or $—SR^5$, wherein $R^5$, which is the same or different, represents an alkyl group or an aryl group; SFR represents a stable free radical; and X represents a polymer formed from at least one polymerizable monomer, wherein said modified particle is a carbon product, a metal oxide, a metal hydroxide, a multi-phase aggregate comprising a carbon phase and a silicon-containing species phase, a multi-phase aggregate containing a carbon phase and a metal-containing species phase, or mixtures thereof.

18. The modified particle of claim 17, wherein said polymerizable monomer is a vinyl or diene containing monomer.

19. The modified particle of claim 17, wherein said particle is a carbon product, a metal oxide, a metal hydroxide, or mixtures thereof.

20. The modified particle of claim 17, wherein said particle is graphite, carbon black, vitreous carbon, activated charcoal, carbon fiber, activated carbon, or mixtures thereof.

21. The modified particle of claim 17, wherein said particle is an aggregate comprising a silicon-containing species phase and a carbon phase.

22. The modified particle of claim 17, wherein said particle is an aggregate comprising a metal-containing species phase and a carbon phase.

23. The modified particle of claim 17, wherein said particle is carbon black.

24. The modified particle of claim 17, wherein said SFR is 2,2,5,5-tetramethyl-1-pyrrolidinyloxy, 2,2,6,6-tetramethyl-1-piperindinyloxy, or derivatives thereof.

25. A method of preparing the modified particle of claim 17, comprising reacting the modified particle of claim 1 with a polymerizable monomer.

26. A polymeric composition comprising the modified particle of claim 17.

27. A coating or ink composition comprising an aqueous or non-aqueous solvent, and the modified particle of claim 17.

28. A modified particle or aggregate comprising a) an aggregate comprising a carbon phase and a metal-containing species phase, an aggregate comprising a carbon phase and a silicon-containing species phase, a metal oxide, or a metal hydroxide and b) attached to said particle or aggregate a group having the formula:

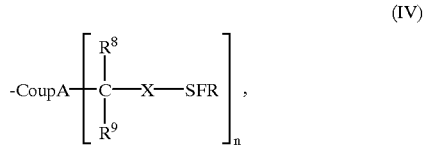

(IV)

wherein CoupA represents a Si-based group, a Ti-based group, or a Zr-based group; $R^8$ and $R^9$, which can be the same or different, represent hydrogen, an alkyl group, an aryl group, $-OR^{10}O$, $-NHR^{10}R^{10}$, $-NR^{10}R^{10}$, or $-SR^{10}$, wherein $R^{10}$, which is the same or different, represents an alkyl group or an aryl group; SFR represents a stable free radical; X represents a polymer formed from at least one polymerizable monomer; and n is an integer of from 1 to 3.

29. The modified particle or aggregate of claim 28, wherein said metal-containing species phase comprises a magnesium-containing species phase, a calcium-containing species phase, a titanium-containing species phase, a vanadium-containing species phase, a cobalt-containing species phase, a nickel-containing species phase, a zirconium-containing species phase, a tin-containing species phase, an antimony-containing species phase, a chromium-containing species phase, a neodymium-containing species phase, a lead-containing species phase, a tellurium-containing species phase, a barium-containing species phase, a cesium-containing species phase, an iron-containing species phase, a molybdenum-containing species phase, or mixtures thereof.

30. The modified particle or aggregate of claim 28, wherein said metal-containing species phase comprises an aluminum-containing species phase.

31. The modified particle or aggregate of claim 28, wherein said metal-containing species phase comprises a zinc-containing species phase.

32. The modified particle or aggregate of claim 28, wherein said particle or aggregate is an aggregate comprising a carbon phase and a metal-containing species phase or an aggregate comprising a carbon phase and silicon-containing species phase.

33. The modified aggregate of claim 28, wherein said SFR is 2,2,5,5-tetramethyl-1-pyrrolidinyloxy, 2,2,6,6-tetramethyl-1-piperindinyloxy, or derivatives thereof.

34. The modified aggregate of claim 28, wherein said polymerizable monomer is a vinyl or diene containing monomer.

35. A polymeric composition comprising the modified particle or aggregate of claim 28.

36. A coating or ink composition comprising an aqueous or non-aqueous solvent, and the modified particle of claim 28.

37. A modified particle comprising a particle having directly attached an organic group comprising a —SFR group, wherein —SFR represents a stable free radical, wherein said particle is a multi-phase aggregate comprising a carbon phase and a silicon-containing species phase, a multi-phase aggregate comprising a carbon phase and a metal-containing species phase, a silica-coated carbon product, or mixtures thereof.

38. The modified particle of claim 37, wherein said particle is an aggregate comprising a silicon-containing species phase and a carbon phase.

39. The modified particle of claim 37, wherein said particle is an aggregate comprising a metal-containing species phase and a carbon phase.

40. The modified particle of claim 37, wherein said SFR is 2,2,5,5-tetramethyl-1-pyrrolidinyloxy, 2,2,6,6-tetramethyl-1-piperindinyloxy, or derivatives thereof.

41. A method of preparing the modified particle of claim 37, comprising heating a stable free radical with a particle at a temperature above 80° C.

42. A polymeric composition comprising the modified particle of claim 37.

43. A coating or ink composition comprising an aqueous or non-aqueous solvent, and the modified particle of claim 37.

44. A modified particle comprising a particle having attached a group having the formula:

wherein SFR represents a stable free radical and X, which is directly attached to said particle, represents a polymer formed from at least one polymerizable monomer, wherein said particle is a multi-phase aggregate comprising a carbon phase and a silicon-containing species phase, a multi-phase aggregate comprising a carbon phase and a metal-containing species phase, a silica-coated carbon product, or mixtures thereof.

45. The modified particle of claim 44, wherein said particle is an aggregate compressing a silicon-containing species phase and a carbon phase.

46. The modified particle of claim 44, wherein said particle is an aggregate comprising a metal-containing species phase and a carbon phase.

47. The modified particle of claim 44, wherein said SFR is 2,2,5,5-tetramethyl-1-pyrrolidinyloxy, 2,2,6,6-tetramethyl-1-piperindinyloxy, or derivatives thereof.

48. The modified particle of claim 44, wherein said polymerizable monomer is a vinyl or diene containing monomer.

49. A polymeric composition comprising the modified particle of claim 44.

50. A coating or ink composition comprising an aqueous or non-aqueous solvent, and the modified particle of claim 44.

* * * * *